United States Patent
Burov et al.

(10) Patent No.: US 9,835,502 B2
(45) Date of Patent: Dec. 5, 2017

(54) TEMPERATURE AND STRAIN SENSING OPTICAL FIBER AND TEMPERATURE AND STRAIN SENSOR

(75) Inventors: Ekaterina Burov, Boulogne-Billancourt (FR); Alain Pastouret, Massy (FR); Louis-Anne De Montmorillon, Versailles (FR)

(73) Assignee: Draka Comteq B.V., Amsterdam (NL)

( * ) Notice: Subject to any disclaimer, the term of this patent is extended or adjusted under 35 U.S.C. 154(b) by 636 days.

(21) Appl. No.: 14/372,125

(22) PCT Filed: Jan. 19, 2012

(86) PCT No.: PCT/IB2012/000245
§ 371 (c)(1),
(2), (4) Date: Jul. 14, 2014

(87) PCT Pub. No.: WO2013/108063
PCT Pub. Date: Jul. 25, 2013

(65) Prior Publication Data
US 2015/0003497 A1    Jan. 1, 2015

(51) Int. Cl.
*G01J 5/08*     (2006.01)
*G01N 25/00*    (2006.01)
*G01J 3/44*     (2006.01)
*G01K 11/32*    (2006.01)
*G01L 1/24*     (2006.01)

(52) U.S. Cl.
CPC .............. *G01K 11/32* (2013.01); *G01L 1/242* (2013.01); *G01K 2011/322* (2013.01)

(58) Field of Classification Search
CPC .... G01J 5/08; G01J 3/44; G01J 5/0821; G01J 3/4412; G01N 25/4866; G01N 25/4813; G01N 25/16; G01N 21/23; G01N 2203/0075; G01N 25/00; G01K 17/00; G01K 2011/322
USPC .......................... 374/137, 45, 130, 131, 141
See application file for complete search history.

(56) References Cited

U.S. PATENT DOCUMENTS 5,208,881 A * 5/1993 Bruesselbach .......... H01S 3/302
                                                         385/27
5,363,463 A    11/1994 Kleinerman
(Continued)

FOREIGN PATENT DOCUMENTS

GB    2140554 A     11/1984
JP    03185304 A  * 8/1991

OTHER PUBLICATIONS

International Search Report for PCT/IB2012/000245 dated Jan. 4, 2013.

*Primary Examiner* — Gail Kaplan Verbitsky
(74) *Attorney, Agent, or Firm* — Shumaker, Loop & Kendrick, LLP

(57) ABSTRACT

Disclosed is a temperature and strain sensing optical fiber including a first doped radial zone (Z1) with an associated first Brillouin shift (BS1) caused by the doping of said zone (Z1) and a second doped radial zone (Z2) with associated second Brillouin shift (BS2) caused by the doping of said second zone (Z2). The concentration and/or composition of the doping materials in said first and second radial zones are chosen such that the first Brillouin Shift (BS1) is different from the second Brillouin Shift (BS2) for all variations of said Brillouin Shifts (BS1, BS2) caused by temperature and/or strain.

13 Claims, 2 Drawing Sheets

(56) References Cited

U.S. PATENT DOCUMENTS

| | | | | |
|---|---|---|---|---|
| 5,991,479 A * | 11/1999 | Kleinerman | | G01J 5/08 250/227.11 |
| 6,380,534 B1 * | 4/2002 | Farhadiroushan | | G01D 5/35364 250/227.14 |
| 6,542,228 B1 * | 4/2003 | Hartog | | G01M 11/3127 356/73.1 |
| 7,008,103 B2 * | 3/2006 | MacDougall | | G01J 5/08 250/227.18 |
| 7,355,163 B2 * | 4/2008 | Watley | | E21B 47/102 250/227.14 |
| 7,504,618 B2 * | 3/2009 | Hartog | | G01J 3/4412 250/227.14 |
| 7,733,561 B2 * | 6/2010 | Mermelstein | | H01S 3/06758 359/337 |
| 8,123,400 B2 * | 2/2012 | Andrejco | | G01K 11/3206 374/131 |
| 8,553,211 B2 * | 10/2013 | Jaaskelainen | | G01D 5/35348 356/73.1 |
| 8,798,420 B2 * | 8/2014 | Yonezawa | | G02B 6/02 385/123 |
| 2001/0019642 A1 * | 9/2001 | Krummrich | | G02B 6/26 385/27 |
| 2007/0171402 A1 * | 7/2007 | Watley | | E21B 47/102 356/73.1 |
| 2008/0273852 A1 * | 11/2008 | Parker | | G01J 5/08 385/128 |
| 2009/0060433 A1 * | 3/2009 | Tadakuma | | G02B 6/03627 385/122 |
| 2009/0148112 A1 * | 6/2009 | Koyamada | | G02B 6/03638 385/127 |
| 2010/0002226 A1 * | 1/2010 | Hartog | | G01D 5/35364 356/73.1 |
| 2010/0046898 A1 * | 2/2010 | DiGiovanni | | G02B 6/02009 385/124 |
| 2010/0116021 A1 * | 5/2010 | O'Brien | | G01N 1/2202 73/23.37 |
| 2010/0238538 A1 * | 9/2010 | Rice | | C03B 37/01211 359/334 |
| 2013/0091942 A1 * | 4/2013 | Samson | | E21B 47/10 73/152.18 |
| 2013/0265569 A1 * | 10/2013 | Le Floch | | G01D 5/35364 356/73.1 |
| 2014/0152982 A1 * | 6/2014 | Gosteli | | G01M 11/085 356/300 |
| 2015/0299024 A1 * | 10/2015 | Sattmann | | C03B 37/01211 428/376 |
| 2015/0377656 A1 * | 12/2015 | Bastianini | | G01D 5/35364 356/301 |
| 2016/0025524 A1 * | 1/2016 | Nikles | | G01K 11/32 356/73.1 |

* cited by examiner

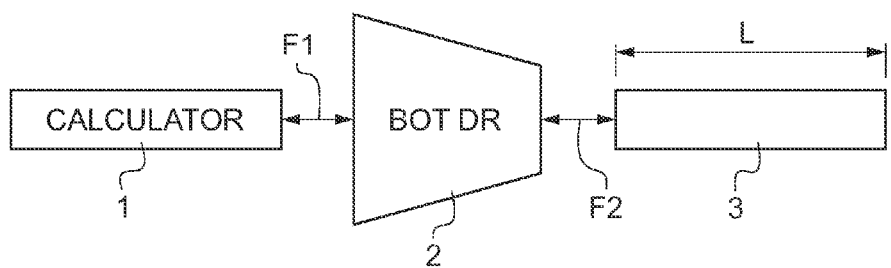
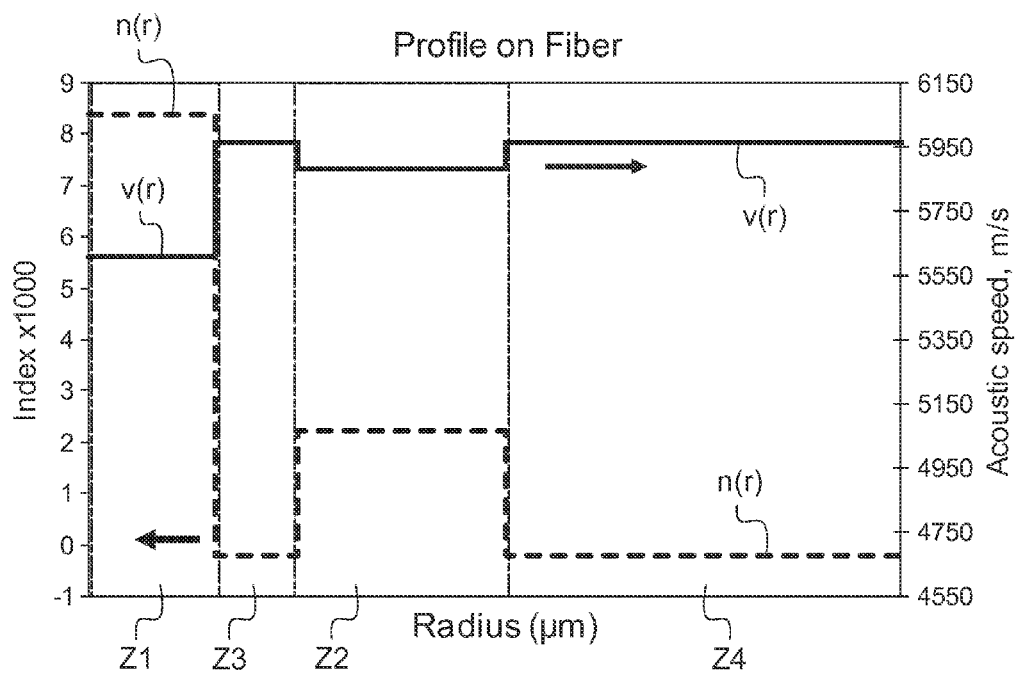

TEMPERATURE AND STRAIN SENSING OPTICAL FIBER AND TEMPERATURE AND STRAIN SENSOR

CROSS-REFERENCE TO RELATED APPLICATION

This U.S. National Stage Application claims priority from PCT/IB2012/000245 filed Jan. 19, 2012, the entirety of which is incorporate by reference.

TECHNICAL FIELD

The invention relates to temperature and strain sensors including one or more sensing optical fibers adapted to sense temperature and/or strain. Many different optical effects (e.g. Brillouin or Raman effects) can be used in sensing optical fibers.

BACKGROUND

Temperature and/or strain sensors comprise one or more sensing optical fibers using one or more of those optical effects, mentioned above. Some prior art sensors are only able to measure one parameter, either temperature or strain. Other prior art sensors are capable of measuring both parameters, but with a poor precision. Other prior art sensors are very sophisticated and expensive to use.

In the sensing optical fiber that is part of a sensor, Brillouin shift(s) are generated by acoustic phonons within the sensing optical fiber. These Brillouin shifts present variations caused by temperature and strain variations on the sensing optical fiber.

Long-range sensors, capable of simultaneous measuring strain and temperature, especially if they are distributed sensors, have many applications for measurements. These sensors are in particular useful in the power and oil industries and also for structural health monitoring, for example, in electricity supply cables. Both Raman and Brillouin effects in the sensing optical fibers can be exploited for the purpose of sensing temperature and/or strain variations.

The Raman intensity in an optical fiber is only sensitive to temperature variation. On the contrary, the intensity and frequency shift of the spontaneous Brillouin scattering signal are sensitive to temperature and strain experienced by the optical fiber. Frequency shift is measured by Brillouin Optical Time Domain Reflectometer (BOTDR).

The main difficulty for the development of Brillouin scattering based sensing systems is to differentiate and quantify the impact of both strain and temperature on the Brillouin frequency shift. Indeed, it is difficult to know whether the observed frequency shift is caused by the change of strain or by the change of temperature. In a laboratory environment, the temperature is essentially constant and its effects can generally be neglected when measuring strain. In many field conditions, this is, however, not the case.

According to a first prior art, described in an article by Bao&Chen, Sensors, 2011, 11, 4152-4187, two different optical fibers are used. In this first prior art, it is proposed to use two optical fibers in the same sensing system. The first optical fiber measures the effect of both strain and temperature, while the other optical fiber is isolated from any strain effects, so that it can be used to monitor the temperature only. The strain is then deduced by comparison of the results for both optical fibers. One drawback of this first prior art is the need for two different optical fibers. Another drawback of this first prior art is the complicated management of results obtained from different optical fibers in order to be able to deduce both temperature and strain variations.

According to a second prior art, described in patent application EP 2110651, two optical fibers having different core and clad compositions are used. In this second prior art, a method and system for simultaneously measuring strain and temperature characteristics of an object are disclosed. This involves the attachment to the object of a pair of optical fibers having different refractive indices. The optical fibers are connected together at at least one end thereof, and laser light is directed into at least one end of the optical fibers. The Brillouin frequency of each of the optical fibers is measured. Then, the strain and temperature characteristics are calculated, based on the coefficients of strain and temperature and the measured Brillouin frequencies of the optical fibers. Here again, this second prior art presents drawbacks which are similar to the drawbacks of the first prior art.

According to a third prior art, described in patent application US 2008/0084914, a very specific optical fiber with two cores, or several optical fibers are used as sensing optical fibers. This type of sensor has a structure which enables accurate temperature measurement in a wide temperature range including a low-temperature region. It seems suitable for independently and accurately determining temperature variations and strains appearing in an object to be measured. In particular, the sensor section has such a structure that the variation of the Brillouin spectrum in response to a disturbance differs between the waveguides. Thus, by simultaneously monitoring the Brillouin spectra that vary in a different manner in a plurality of waveguides, it seems possible not only to measure accurately the temperature in a wide temperature range including a low-temperature region, but also to make distinction between the strain and temperature. Use of a very specific optical fiber or of several optical fibers makes this third prior art present comparable drawback to first prior art.

According to a fourth prior art, described in patent application WO 2010/011211, a sensing system is known using two optical sources generating respectively two optical signals at two different wavelengths in order to get two different Brillouin shifts. This sensing system presents the drawback of being relatively complex.

According to a fifth prior art, described in an article by T. R. Parker and al., IEEE JOURNAL OF QUANTUM ELECTRONICS, VOL. 34, NO. 4, APRIL 1998, 645-659, a sensing system is known using, simultaneously, both Brillouin gain and Brillouin shift: The analysis of both Brillouin gain and Brillouin shift provides simultaneous temperature and strain measurements using the standard communication optical. A drawback of this fifth prior art is its lack of precision due to insufficient spatial, temperature and strain resolution. Besides, using Brillouin gain, makes the sensing system of this fifth prior art very sensitive to optical fiber aging.

According to a sixth prior art, described in an article by Yu, Q and al., Opt. Lett. 2004, 29, 17-19, to use of three parameters is known, viz. the Brillouin frequency, the Stokes power, and the Brillouin spectral width. These three parameters can be simultaneously used for temperature and strain measurements, but a very specific and expensive optical fiber is needed to obtain a good sensing precision. Because controlling the stability of this very specific optical fiber over a long length is very difficult, the corresponding sensing system—using this very specific sensing optical fiber—cannot be used for distributed sensors over a long distance. Besides, this sensing system appears to be rather sensitive to optical fiber aging.

According to a seventh prior art, described in an article by V. Lanticq, PhD thesis, 2009, http://tel.archives-ouvertes.fr/pastel-00006220/, the use of a special single mode optical fiber is known. Said special single mode optical fiber presents a double Brillouin shift due to two germanium doped zones respectively in clad and core. These two zones are respectively doped with different concentrations of doping element. Since the two doped zones are doped with the same doping element, and since the difference of concentrations is not very high, the two Brillouin shifts present close temperature and strain evolutions. Therefore, discriminating between temperature and strain contributions is very difficult to perform. Obtained precision is consequently poor.

According to a eighth prior art, described in patent application US 2003/0103549, a sensing system using successively several sections of different optical fibers is contemplated. Here, each optical fiber presents a doped core with one doping element. The optical fiber line, obtained from different optical fibers concatenated together, presents several Brillouin shifts which can be used to discriminate between temperature and strain contributions. One drawback of this eighth prior art is the complexity of a sensing system based on the concatenation of several different optical fibers together. Another drawback of this eighth prior art is that its sensing system only gives a global temperature and strain measurement and not distributed measures all along the sensing optical fibers: this sensing system is a local sensor and not a distributed sensor.

SUMMARY

An object of embodiments of the present invention is to alleviate at least partly the above mentioned drawbacks.

More particularly, embodiments of the invention aim to provide a simple dual sensor adapted to sense simultaneously temperature and strain variations while using a single sensing optical fiber adapted to discriminate rather easily and with a rather good precision temperature and/or strain variations.

Embodiments of the invention aim to provide a dual sensing optical fiber which presents two distinct Brillouin shifts whose variations with respect to temperature and strain are sufficiently different so that by measuring the variations of these two Brillouin shifts, it is possible on the one hand to distinguish between temperature and/or strain constraints having caused these measured Brillouin shifts variations, and on the other hand to quantify with a satisfactory precision, the respective variations of temperature and/or strain which have caused these measured Brillouin shifts variations. These two Brillouin shifts are due to a multimode acoustic behavior of the sensing optical fiber. These two Brillouin shifts are respectively obtained by two doped zones, preferably a core and a ring, preferably presenting different doping elements and/or different doping concentrations.

According to embodiments of the invention, the temperature and strain sensor uses only one optical fiber for dual temperature and strain sensing. Preferably, the temperature and strain sensor according to the present invention is a distributed sensor allowing for measurements of temperature and/or strain variations at several positions, advantageously at numerous positions, all along the sensing optical fiber.

According to embodiments of the invention, the temperature and strain sensor is simple, cost effective and reliable, because of the use of only one sensing optical fiber and of only two Brillouin shifts of this single sensing optical fiber as measured varying parameters.

According to embodiments of the invention, the used temperature and strain sensing optical fiber can be very long. Indeed, basing the measurement on Brillouin shifts variations only, not using any gain or attenuation characteristic helps increasing the length of usable sensing optical fiber.

According to embodiments of the invention, the doping profiles of the temperature and strain sensing optical fiber may be easily made through usual fiber manufacturing processes, for example Plasma Chemical Vapor Deposition (PCVD) and Modified Chemical Vapor Deposition (MCVD) processes.

According to embodiments of the invention, the sensing efficiency of the temperature and strain sensing optical fiber is not impacted, or at least little impacted, by fiber ageing. Indeed the Brillouin shifts are not or little fiber ageing dependant, whereas other properties of optical fiber, like gain or attenuation are.

This object and other objects may be achieved with a temperature and strain sensing optical fiber comprising a first doped radial zone with an associated first Brillouin shift caused by the doping of said zone and a second doped radial zone with associated second Brillouin shift caused by the doping of said second zone, wherein the concentration and/or composition of the doping materials in said first and second radial zones are chosen such that the first Brillouin Shift is different from the second Brillouin Shift for all variations of said Brillouin Shifts caused by temperature and/or strain.

This object and other objects may also be achieved with a temperature and strain sensing optical fiber having at least two radial zones differently doped so as to present isothermal and adiabatic compressibility coefficients sufficiently different between said two zones so as to differentiate the respective contributions, of temperature and strain variations, to the variations of at least two distinct Brillouin shifts of said sensing optical fiber Preferred embodiments comprise one or more of the following features:
- said two radial zones are sufficiently differently doped so that a gap between said two Brillouin shifts exists for all variations of said two Brillouin shifts caused by temperature and/or strain variations.
- said two radial zones are sufficiently differently doped so that respective variations of said two Brillouin shifts caused by a same temperature variation are different from each other of more than 20%, preferably of more than 50%.
- said two radial zones are sufficiently differently doped so that respective variations of said two Brillouin shifts caused by a same strain variation are different from each other of more than 5%, preferably of more than 10%.
- said two radial zones are respectively a core and a ring of said sensing optical fiber.
- said two radial zones respectively comprise different doping combinations of the same doping materials, each said radial zone comprising at least two distinct doping materials.
- at least a first doping material in a first of said two radial zones is at least five times, preferably at least ten times, more concentrated than said first doping material in a second of said two radial zones different from said first radial zone.

at least a second doping material, different from said first doping material, in said second radial zone is at least five times, preferably at least ten times, more concentrated than said second doping material in said first radial zone.

at least a first doping material is present in only a first of said two radial zones.

at least a second doping material, different from said first doping material, is present in only a second of said two radial zones different from said first radial zone.

said first doping material is Germanium.

said second doping material is aluminum or phosphorus or fluorine or boron.

said sensing optical fiber is a single mode optical fiber.

in said sensing optical fiber, $\Delta v_1$ and $\Delta v_2$ being variations of said two Brillouin shifts, $\Delta \epsilon$ being a variation of strain constraint, $\Delta T$ being a variation of temperature constraint, $A_1$ and $A_2$ and $B_1$ and $B_2$ being coefficients such that:

$$\begin{pmatrix} \Delta v_1 \\ \Delta v_2 \end{pmatrix} = \begin{pmatrix} A_1 & B_1 \\ A_2 & B_2 \end{pmatrix} \begin{pmatrix} \Delta T \\ \Delta \epsilon \end{pmatrix}$$

and $$M = \begin{pmatrix} A_1 & B_1 \\ A_2 & B_2 \end{pmatrix}$$

and such that: det $M = A_1 B_2 - A_2 B_1$,

|det M| is more than 0.02 MHz$^2$/K-$\mu\epsilon$, and more preferably is more than 0.04 MHz$^2$/K-$\mu\epsilon$.

in said sensing optical fiber, $\Delta v_1$ and $\Delta v_2$ being variations of said two Brillouin shifts, $\Delta \epsilon$ being a variation of strain constraint, $\Delta T$ being a variation of temperature constraint, $A_1$ and $A_2$ and $B_1$ and $B_2$ being coefficients such that:

$$\begin{pmatrix} \Delta v_1 \\ \Delta v_2 \end{pmatrix} = \begin{pmatrix} A_1 & B_1 \\ A_2 & B_2 \end{pmatrix} \begin{pmatrix} \Delta T \\ \Delta \epsilon \end{pmatrix}$$

and $$M = \begin{pmatrix} A_1 & B_1 \\ A_2 & B_2 \end{pmatrix}$$

and such that: det $M = A_1 B_2 - A_2 B_1$, and such that: $Pr(T) = \sqrt{B_1^2 + B_2^2}/|\det M|$ Pr(T) is less than 5 K/MHz, and preferably is less than 2.5 K/MHz, and more preferably is less than 1.25 K/MHz.

in said sensing optical fiber, $\Delta v_1$ and $\Delta v_2$ being variations of said two Brillouin shifts, $\Delta \epsilon$ being a variation of strain constraint, $\Delta T$ being a variation of temperature constraint, $A_1$ and $A_2$ and $B_1$ and $B_2$ being coefficients such that:

$$\begin{pmatrix} \Delta v_1 \\ \Delta v_2 \end{pmatrix} = \begin{pmatrix} A_1 & B_1 \\ A_2 & B_2 \end{pmatrix} \begin{pmatrix} \Delta T \\ \Delta \epsilon \end{pmatrix}$$

and $$M = \begin{pmatrix} A_1 & B_1 \\ A_2 & B_2 \end{pmatrix}$$

and such that: det $M = A_1 B_2 - A_2 B_1$, and such that: $Pr(\epsilon) = \sqrt{A_1^2 + A_2^2}/|\det M|$ Pr($\epsilon$) is less than 100 $\mu\epsilon$/MHz, and preferably is less than 50 $\mu\epsilon$/MHz.

This object and other objects may also be achieved with a temperature and strain sensor comprising at least a temperature and strain sensing fiber according to embodiments of the invention.

Preferred embodiments comprise one or more of the following features:

said sensor is a distributed sensor adapted to sense temperature and strain in at least several positions located along said sensing fiber, preferably in any position located along said sensing fiber.

said sensor is adapted to sense variations of said two Brillouin shifts by Brillouin Optical Time Domain Reflectometry.

length of said sensing fiber is more than 10 meters, preferably more than 50 meters, more preferably more than 100 meters.

This object and other objects may also be achieved with a temperature and strain sensor including one temperature and strain sensing optical fiber having at least two radial zones sufficiently differently doped so as to present at least two distinct Stokes Brillouin shifts spaced apart from each other.

This object and other objects may also be achieved with a temperature and strain sensing method comprising a step of measuring the variations of at least two distinct Brillouin shifts caused by variations of temperature and/or strain on a sensing optical fiber having at least two radial zones differently doped so as to present different isothermal and adiabatic compressibility coefficients, a step of estimating the respective contributions of said temperature and/or strain variations to said measured variations of said two distinct Brillouin shifts, a step of evaluating said variations of temperature and/or strain from said estimated contributions.

According to some embodiments of the invention, the two distinct Brillouin shifts are located on the same side with respect to the optical frequency of laser source used in sensor. Preferably, these two Brillouin shifts are Stokes Brillouin shifts. The temperature and strain sensor preferably uses the variations of those two Stokes Brillouin shifts to estimate the temperature and strain variations. Alternatively, in an embodiment, the temperature and strain sensor could use the variations of the two Anti-Stokes Brillouin shifts corresponding to those two Stokes Brillouin shifts, to estimate the temperature and strain variations. Use of only one Stokes Brillouin shift and of its anti Stokes symmetric Brillouin shift would not allow discriminating between temperature and strain variations, because variations of these Brillouin shifts would be too similar to each other.

According to some embodiments of the invention, the temperature and strain sensor uses the Brillouin shifts variations, but does not use the Brillouin gains variations.

According to some embodiments of the invention, Brillouin scattering measured is a spontaneous Brillouin scattering, because this makes the temperature and strain sensor rather simple since only one laser source is needed.

According to some embodiments of the invention, the Brillouin scattering measured is a stimulated Brillouin scattering, because this makes the temperature and strain sensor more precise and allows detection all along a longer sensing optical fiber than with a temperature and strain sensor based on spontaneous Brillouin scattering. However two different laser sources would be needed.

According to some embodiments of the invention, the temperature and strain sensor may be used in drilling or boring wells, and in pipelines.

According to some embodiments of the invention, the temperature and strain sensor may be used in electricity supply cables.

According to some embodiments of the invention, the temperature and strain sensor may be used in structure health monitoring.

According to another object of the invention, which can be combined with any of preceding embodiments, there is a temperature and strain sensing optical fiber having at least two radial zones comprising different doping elements and/ or different concentrations of doping elements so as to present isothermal and/or adiabatic compressibility coefficients sufficiently different between said two zones so as to cause sufficiently different variations between at least two distinct Brillouin shifts of said sensing optical fiber so as to differentiate the respective contributions, of temperature and strain variations, to said Brillouin shifts (BS1, BS2) caused variations. Preferably, said two doped radial zones correspond respectively to said two distinct Brillouin shifts of said sensing optical fiber.

Further features and advantages of the invention will appear from the following description of embodiments of the invention, given as non-limiting examples, with reference to the accompanying drawings listed hereunder.

BRIEF DESCRIPTION OF THE DRAWINGS

FIG. 1 shows an example of a temperature and strain sensor according to embodiments of the present invention.

FIG. 2 shows an example of a temperature and strain sensing optical fiber according to embodiments of the present invention.

DETAILED DESCRIPTION OF THE INVENTION

Figure 3:
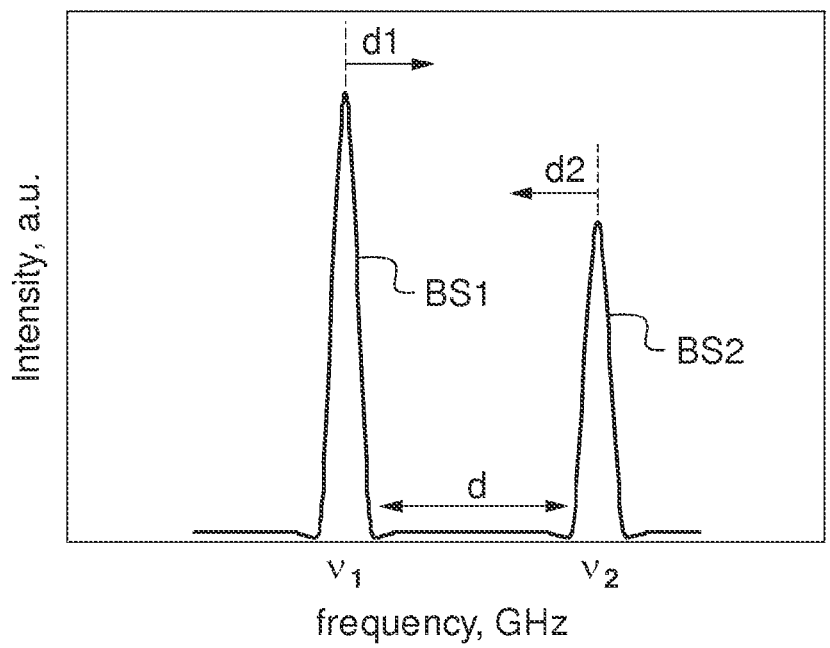
FIG. 3 shows an example of two Brillouin shifts whose variations are used in a temperature and strain sensor according to embodiments of the present invention.

FIG. 1 shows an example of a temperature and strain sensor according to embodiments of the invention. In the following description the terms "temperature and strain sensor" and "dual sensor" will both have the same meaning. In the following description the terms "temperature and strain sensing optical fiber" and "dual sensing fiber" will both have the same meaning.

The dual sensor comprises a calculator 1, a Brillouin Optical Time Domain Reflectometer 2 (more simply called BOTDR), a dual sensing fiber 3. The dual sensor is adapted to sense variations of the two Brillouin shifts based on the principle of Brillouin Optical Time Domain Reflectometry. Preferably, the dual sensor comprises only one dual sensing fiber 3.

The dual sensing fiber 3 presents two distinct Brillouin shifts. The dual sensing fiber 3 presents a length L. As a practical preferred example, the length L of the dual sensing fiber is more than 10 meter, preferably more than 50 meter, more preferably more than 100 meter. The dual sensor is a distributed sensor adapted to sense temperature and strain in at least several positions located along the dual sensing fiber 3 and preferably in any position located along the dual sensing fiber 3. Preferably, temperature and strain variations can be measured practically all over the length L of the dual sensing fiber 3.

The BOTDR 2 comprises a laser source and a receiver not shown. The laser source launches light at an operating wavelength, for example at 1550 nm, into the dual sensing fiber 3. The two Brillouin shifts are located on the same side of the operating wavelength of the laser source, they will be for example Stokes Brillouin shifts. These two Stokes Brillouin shifts have their symmetric Anti-Stokes Brillouin shifts located on the other side of the operating wavelength of the laser source. The dual sensor can use these two Stokes Brillouin shifts and/or these symmetric Anti-Stokes Brillouin shifts. At least one Stokes and/or Anti Stokes Brillouin shift has to be used and at least the other Stokes and/or Anti Stokes Brillouin shift has to used. It would be insufficient to use only one Stokes Brillouin shift and its symmetric Anti Stokes Brillouin shift.

All along the dual sensing fiber 3, light at the two Brillouin shifts of the dual sensing fiber is backscattered towards the BOTDR 2. This Brillouin backscattered light, once received in the BOTDR 2 is detected and analyzed in the receiver of the BOTDR 2. Hence, the Brillouin shifts variations can be computed in the BOTDR 2. These light exchanges between the BOTDR 2 and the dual sensing fiber 3 are shown by the bidirectional arrow F2.

The dual sensor includes one dual sensing fiber 3 having at least two radial zones differently doped and having at least two distinct Stokes Brillouin shifts, preferably, spaced apart from each other. In this manner, whatever variations these two distinct Stokes Brillouin shifts undergo, they will not lead to a mixing between the two distinct Stokes Brillouin shifts, which mixing would makes distinguishing between temperature and strain contributions more difficult. Preferably, these at least two radial zones differently doped each present the same doping and the same geometry all over the length of the dual sensing fiber. In this description with "two radial zones differently doped" is meant that the radial zones each have a different doping.

The calculator 1 exchanges information with the BOTDR 2. The calculator 1 can drive the BOTDR 2. The BOTDR 2 will send to the calculator 1 information representative of the two distinct Brillouin shifts variations so that the calculator can compute therefrom the respective temperature and/or strain variations responsible for the measured two distinct Brillouin shifts variations. Information and signal exchanges between the calculator 1 and the BOTDR 2 are shown by the arrow F1. Once those temperature and/or strain variations are computed, they may be displayed on a screen not shown on FIG. 1.

FIG. 2 shows an example of a temperature and strain sensing optical fiber according to embodiments of the present invention. The horizontal axis shows the radius value, which is the radial distance from the dual sensing fiber center, expressed in micrometers (μm). The left vertical axis shows 1000 times the refractive index value gap n(r) with respect to the refractive index of the cladding. The right vertical axis shows the acoustic speed V(r), expressed in meter per second (m/s).

In an embodiment, the dual sensing fiber comprises four distinct concentric radial zones Z1 to Z4 extending from the optical fiber center to the optical fiber coating. From the center to the periphery of the dual sensing fiber, there are four different zones which are: the core Z1, the inner cladding Z3, the ring Z2, the outer cladding Z4, and on the periphery of the outer cladding Z4, there is the optical fiber coating not shown on FIG. 2.

The inner cladding Z3 has preferably the same refractive index as the cladding Z4. Both zones Z3 and Z4 are in that specific embodiment not doped or negligibly doped zones.

Zones Z1 and Z2 are doped zones. They are doped in such a manner that core Z1 has a higher refractive index than doped ring Z2. Doped ring Z2 has preferably a higher refractive index than inner cladding Z3 and than cladding Z4.

The acoustic speed varies reciprocally to the refractive index variation. The higher the refractive index value, the lower the acoustic speed in the corresponding zone of the dual sensing fiber, and vice versa. The two different acoustic speeds in core Z1 and in ring Z2 respectively correspond to two Brillouin shifts that will vary according to temperature and strain constraints. The acoustic speed difference between doped core Z1 and doped ring Z2 will be between about 50 and 600 m/s, in order to insure two Brillouin shifts with a frequency difference between about 0.1 and 1 GHz. The dual sensing fiber presents at least two radial zones differently doped, which are here core Z1 and ring Z2, so as to present isothermal and/or adiabatic compressibility coefficients sufficiently different between core Z1 and ring Z2 so as to differentiate the respective contributions, of temperature and strain variations, to the variations of those two distinct corresponding Brillouin shifts. Preferably, in ring Z2, there is a good overlap between the optic mode and the acoustic mode so as to get a good Brillouin shift in ring Z2, where variations of this Brillouin shift according to temperature and/or strain can be easily measured.

The invention discloses a single mode optical fiber able to simultaneously realize temperature and strain or stress sensing through exploitation of two Brillouin shifts due to a multimode acoustic behavior. Here, one acoustic mode can propagate in the core Z1 and corresponds to one Brillouin shift, whereas one other acoustic mode can propagate in the ring Z2 and corresponds to another Brillouin shift. These two doped zones, core Z1 and ring Z2, being differently doped, present different isothermal and adiabatic compressibility coefficients, which in turn allow differentiating Brillouin shifts variations respectively due to temperature and strain. This dual sensing fiber allows a simple, cost effective and reliable sensing solution, even over long fiber lengths. Moreover, the sensing can be rather precise with a reliability not impacted or little impacted by fiber aging.

The doping elements used to dope core Z1 and ring Z2 can be independently selected from Germanium Ge, Aluminum Al, Phosphorus P, Fluorine F, or Boron B. In other words, the doping element or combination of doping elements used for doping core Z1 can be different from the doping element or combination of doping elements used for doping ring Z2. It is also possible that different concentrations of the same doping element or combination of doping elements are used for core Z1 and ring Z2.

In a first alternative, in the dual sensing fiber, the two radial zones, which are the core Z1 and the ring Z2, respectively comprise different doping combinations of the same doping materials, each radial zone comprising at least two distinct doping materials. A simple and effective way to get sufficiently distinct Brillouin shifts and sufficiently differently varying Brillouin shifts, is to get sufficiently different doping elements combinations between the core Z1 and the ring Z2.

In an embodiment, that can be combined with former first and/or next second alternatives, at least a first doping material in core Z1 is at least five times, preferably at least ten times, more concentrated than the first doping material in ring Z2. Preferably, at least a second doping material, different from the first doping material, in ring Z2 is at least five times, preferably at least ten times, more concentrated than the second doping material in core Z1.

In a second alternative, another simple and effective way to get sufficiently distinct Brillouin shifts and sufficiently differently varying Brillouin shifts, is to get sufficiently different doping elements combinations between the core Z1 and the ring Z2 by having some doping elements only in one doped radial zone and some other doping elements only in another doped radial zone. Therefore, at least a first doping material is present in only the core Z1. Therefore also, at least a second doping material, different from the first doping material, is present in only the ring Z2. Those first and second doping elements could however be found too in small quantities in inner cladding zone or in cladding zone, because there they would have no more influence on the two Brillouin shifts under consideration.

Preferably, the dual sensing optical fiber is a single mode optical fiber. A multimode dual sensing optical fiber could be used, but it would be more complex, retrieving the respective contributions effects of temperature and strain within several optical modes would need taking into account the fact that temperature and strain may have different effect on two different optical modes.

In a preferred embodiment, the second preceding alternative is used. The dual sensing fiber includes at least two distinct doped radial zones, which are located in the core and in the cladding parts of the optical fiber, preferably the core Z1 and the ring Z2, that do not contain the same doping elements. At least one doping element of the core Z1 is not present in the ring Z2 and vice versa. The doping elements or dopants are chosen from the group comprising germanium Ge, aluminum Al, phosphorus P, fluorine F, boron B.

The Table 1 summarizes some possible doping elements combination for core Z1 and ring Z2, showing combinations between a dopant in zone 1 (core Z1) and a different dopant in zone 2 (ring Z2). A single + shows a combination leading to good results for the resulting Brillouin shifts. Double ++ combinations give even better results than single + combinations with respect to the capacity to distinguish between temperature and strain contributions.

TABLE 1

| | Zone 1 Dopants | | | | |
|---|---|---|---|---|---|
| Zone 2 Dopants | Ge | Al | P | F | B |
| Ge | | ++ | ++ | + | + |
| Al | + | | ++ | + | + |
| P | + | + | | + | + |
| F | ++ | + | + | | + |
| B | ++ | + | + | + | |

From table 1, it can be seen that Ge is a particularly interesting doping element, especially when present in core Z1. When Ge is used in ring Z2, Al and P are particularly interesting doping elements for the core Z1. The precise doped ring Z2 position together with the fiber refractive index profile, as shown in FIG. 2, is also determined to ensure the monomode optical propagation in the core Z1.

The presence of two Brillouin resonances lies in that two different acoustic modes located in the dual sensing fiber core/cladding area interact with the light wave.

The position of the Brillouin shift in each doped area can be expressed as:

$$v_i = \frac{2n_{\mathit{eff}} V_i}{\lambda_0} \quad (1)$$

Where, $n_{eff}$ is the effective optical refractive index of the fundamental optical mode;

$\lambda_0$ is the incident wavelength;

$V_i$ is the acoustic velocity in the zone "i", which depends on the composition of this zone.

The incremental contributions of doping elements from Table 1 to the acoustic speed of the doped radial zones and consequently the position of the Brillouin shifts are given in the Table 2 below according to their content.

TABLE 2

| Dopant | Δn %/wt. % | $V_S$ %/wt. % | $V_D$ %/wt. % |
|---|---|---|---|
| $G_eO_2$ | +0.056 | −0.49 | −0.47 |
| F | −0.31 | −3.1 | −3.6 |
| $P_2O_5$ | +0.020 | −0.41 | −0.31 |
| $TiO_2$ | +0.23 | −0.45 | −0.59 |
| $Al_2O_3$ | +0.063 | +0.21 | +0.42 |
| $B_2O_3$ | −0.033 | −1.18 | −1.23 |

C. A. S de Oliveira, J. Opt. Soc. Am B, 10, 969-972 (1993)

Table 2 shows the incremental contribution of main glass doping elements, shown in the first column, to refractive index, shown in the second column, and to acoustic speed, shown in third column for a transversal mode and in fourth column for a longitudinal mode. Here for Brillouin shift, the acoustic mode which is used is the longitudinal mode.

From this Table 2, it can be seen that by choosing the composition of the doped radial zones of dual sensing fiber, it is possible to adjust its refractive index and its Brillouin frequency shift. In particular, the difference between Brillouin frequency shift of each doped zone can be rather easily fixed at a value higher, and preferably much higher, than the maximal variation of each Brillouin shift due to temperature and strain.

Each of the two distinct Brillouin shifts then presents a different temperature and strain sensitivity. This property allows for performing in a simpler way the temperature and strain discrimination in the dual sensing fiber. It is known that the Brillouin shift varies with the temperature and strain and the slope of this variation can be experimentally determined from measurements at constant temperature or strain.

The evolution of the two Brillouin shifts $v_1$ and $v_2$ can be expressed according temperature T and strain $\epsilon$ by the following relations:

$$\Delta v_1(T, \varepsilon) = A_1 \Delta T + B_1 \Delta \varepsilon \quad (2)$$

$$\Delta v_2(T, \varepsilon) = A_2 \Delta T + B_2 \Delta \varepsilon, \quad (3)$$

Where, $$A_1 = \frac{dv_1}{dT};$$

$$A_2 = \frac{dv_2}{dT};$$

$$B_1 = \frac{dv_1}{d\varepsilon};$$

$$B_2 = \frac{dv_2}{d\varepsilon}$$

$$\begin{pmatrix} \Delta v_1 \\ \Delta v_2 \end{pmatrix} = \begin{pmatrix} A_1 & B_1 \\ A_2 & B_2 \end{pmatrix} \begin{pmatrix} \Delta T \\ \Delta \varepsilon \end{pmatrix} \quad (3bis)$$

$$M = \begin{pmatrix} A_1 & B_1 \\ A_2 & B_2 \end{pmatrix} \quad (3ter)$$

$$\det M = A_1 B_2 - A_2 B_1 \quad (3quater)$$

The temperature and strain variations can be simultaneously measured from the measurement of both dual sensing fiber Brillouin shifts, according to the relations below:

$$\Delta T = \frac{B_1 \Delta v_2 - B_2 \Delta v_1}{(A_2 B_1 - A_1 B_2)} = \frac{B_1 \Delta v_2 - B_2 \Delta v_1}{\det M}; \quad (4)$$

$$\Delta \varepsilon = \frac{A_2 \Delta v_1 - A_1 \Delta v_2}{(A_2 B_1 - A_1 B_2)} = \frac{A_2 \Delta v_1 - A_1 \Delta v_2}{\det M} \quad (5)$$

The Brillouin shift is due to local fluctuation in the matter density. As the number of atoms in the matter is fixed, it implies that density variation is directly linked to volume variation with temperature and strain:

$$\frac{d\rho}{\rho(T, \varepsilon)} = -\frac{dV}{V(T, \varepsilon)} = \beta_T d\varepsilon - \alpha dT, \quad (6)$$

Where
ρ is the material density;
V is the volume of the material;
α is the isobar dilatation coefficient;
$\beta_T$ is the isothermal compressibility coefficient.

On the basis of the equations (2), (3) and (6) it is then possible to directly correlate the Brillouin shift coefficients of equations (2) and (3) with the material compressibility coefficient $K_T$ and α of equation (6). It gives:

$$A_1 = \frac{dv_1}{dT} = C\alpha_1;$$

$$A_2 = \frac{dv_2}{dT} = C\alpha_2;$$

$$B_1 = \frac{dv_1}{d\varepsilon} = C'\beta_{T1};$$

$$B_2 = \frac{dv_2}{d\varepsilon} = C'\beta_{T2};$$

$\alpha_1$ and $\alpha_2$ are adiabatic compressibility coefficients that can vary with T° C. according to the relation:

$\alpha(T) = \alpha_0 + \alpha'_0 \cdot T$ $\alpha_0$: adiabatic compressibility at 20° C.

$\beta_{T1}$ and $\beta_{T2}$ are isothermal compressibility coefficients that vary with pressure according to the relation:

$\beta_T(P) = \beta_0 + \beta'_T P$ $\beta_0$: isothermal compressibility at 1 bar The coefficients C and C' are constants which do not depend on the material properties. These coefficients C and C' are coefficients estimated from standard Single Mode Fiber doped with 5% doping element Ge concentration in the core Z1 and are used to calculate the values of Tables 3b to 3d described hereafter. These coefficients C and C' are respectively 1.42 $10^6$ MHz and 1.69 MHz. GPa/με.

Now, an example of realization of a dual sensing optical fiber according to example 1 of Table 3a to 3d will be explained in detail through description of the manufacturing steps of the dual sensing fiber.

In a first step, a core rod is realized by Modified Chemical Vapor Deposition. To realize the cladding, the cladding part of the preform is realized by the consecutive deposition of glass layer on the internal part of a support glass tube in rotation through plasma reaction of glass precursors at high temperature. Glass precursors can, for example, be $SiCl_4$ or $GeCl_4$ or $POCl_3$. The refractive index profile of the cladding part, including the Ge doped ring is realized by adjusting the composition of the glass forming precursors during layers deposition. To realize the core, the core part is realized in the same manner as the cladding part, except the composition of the glass layers for the realization of the P doped zone. The tube including cladding and core layers is then collapsed at higher temperature in order to get the core rod.

In a second step, the overcladding is realized. The previous core rod is overcladded in order to reach expected core/clad ratio able to ensure a monomode light propagation. This is obtained by fusing glass tubes over the core rod or by externally adding glass layer by a plasma deposition process.

In a third step, the preform consisting of an overcladded core rod is drawn into the dual sensing fiber.

The dual sensing fiber obtained as explained above presents the two distinct Brillouin shifts as well as temperature and strain coefficients for core Z1 and ring Z2 which are given in the Table 3a, 3b and 3c below, with the other main parameters of the dual sensing fiber. Table 3a represents common features to three examples Ex0, Ex1 and Ex2 of dual sensing optical fibers.

TABLE 3a

|   | Core Z1 | Ring Z2 |
|---|---------|---------|
| R, µm | 0-2.3 | 4-8 |

In table 3a, the radial extensions of the different doped radial zones are shown in micrometers. Core Z1 extends from optical fiber center to a 2.3 µm radius. Ring Z2 extends from a 4 µm radius to a 8 µm radius.

This optical fiber is involved in realizing a dual sensor able to detect temperature and strain variations at the same time. It allows detecting variation equal to or less than 2° C. and 56µε respectively for temperature and strain environment for the 1 MHz spectral resolution. Tables 3b to 3d show parameters of the dual sensing fiber, Table 3b parameters of the core Z1, Table 3c parameters of the ring Z2, and Table 3d properties of the dual sensing fiber representative of its precision and of its efficiency as a temperature and strain sensing optical fiber. Tables 3b to 3c show the properties of two different examples Ex1 and Ex2 of dual sensing optical fibers. Ex1 and Ex2 are two preferred example which work very well as dual sensing fibers. Ex0 is a comparative example which does not belong to the invention. It does not show the same good effect as the examples according to the invention, Ex1 and Ex2.

In Table 3b dealing with core Z1 and in Table 3c dealing with ring Z2, in the first column are given the numbers of the examples of dual sensing fibers. In second column, is given the type of doping element. In third column is given the concentration of doping element expressed in percentage. In fourth column is given the refractive index difference with respect to cladding index. In fifth column is given the acoustic speed expressed in meters per second. In sixth column, is given the Brillouin shift expressed in Gigahertz. In seventh column is given the adiabatic compressibility expressed in per Kelvin. In eighth column is given the isothermal compressibility in per Gigapascals. In ninth column is given the A1 or A2 coefficient expressed in MegaHertz per Kelvin corresponding to adiabatic compressibility. In tenth column is given the B1 or B2 coefficient expressed in µε, 1µε corresponding to a 1 mm elongation for a 1 m fiber length, corresponding to isothermal compressibility.

TABLE 3B

Core Parameters

Core Z1

|  | Dopant1 | Conc1 (wt %) | $\Delta n1 \times 10^3$ | $V_{i1}$ (m/s) | $\nu_{i1}$ (GHz) | $\alpha 1 \times 10^6$ (K-1) | $\beta_{T1} \times 10^2$ (Gpa-1) | A1 (MHz/K) | B1 (MHz/µε) |
|---|---|---|---|---|---|---|---|---|---|
| Ex 0 | Ge | 7.73% | 8.5 | 5664 | 10.6 | 0.84 | 2.98 | 1.1844 | −0.05036 |
| Ex 1 | P | 8.50% | 8.5 | 5609 | 10.46 | 1.34 | 3.29 | 1.9028 | −0.0556 |
| Ex 2 | P | 8.50% | 8.5 | 5609 | 10.46 | 1.34 | 3.29 | 1.9028 | −0.0556 |
| Ex 3 | Ge/F | 10%/0.83% | 11/−2.5 | 5396 | 10.07 | 1.24 | 3.3 | 1.7608 | −0.05577 |

TABLE 3C

Ring Parameters

Ring Z2

|  | Dopant2 | Conc2 (wt %) | $\Delta n2 \times 10^3$ | $V_{i2}$ (m/s) | $\nu_{i2}$ (GHz) | $\alpha 2 \times 10^6$ (K-1) | $\beta_{T2} \times 10^2$ (Gpa-1) | A2 (MHz/K) | B2 (MHz/µε) |
|---|---|---|---|---|---|---|---|---|---|
| Ex 0 | Ge | 2.5 | 2.75 | 5881 | 10.97 | 0.71 | 2.93 | 1.0011 | −0.04952 |
| Ex 1 | Ge | 2.5 | 2.75 | 5881 | 10.97 | 0.71 | 2.93 | 1.0082 | −0.04952 |
| Ex 2 | Al | 0.92 | 2.75 | 6023 | 11.24 | 0.52 | 2.91 | 0.7384 | −0.04918 |
| Ex 3 | Ge/F | 2.73/0.08 | 3/−0.25 | 5852 | 10.92 | 0.72 | 2.93 | 1.0224 | −0.049517 |

TABLE 3d

| | Criterias | | |
|---|---|---|---|
| | Criteria | | |
| | det M (MHz²/K-µε) | Pr(T) (K/MHz) | Pr(ε) (µε/MHz) |
| Ex0 | −0.008 | 9 | 188 |
| Ex1 | −0.038 | 2 | 56 |
| Ex2 | −0.053 | 1 | 39 |
| Ex3 | −0.030 | 2 | 67 |

In Table 3d, three parameters representative of discrimination efficiency between temperature and strain of dual sensing fiber for detM, temperature sensing precision value Pr(T), and strain sensing precision value Pr(ε) are shown. The higher the discrimination efficiency is, the better it is. The smaller the temperature and strain precision values are, the more precise the dual sensing fiber is.

Preferably, |detM| is higher than 0.02 MHz²/K-µε, and more preferably it is higher than 0.04 MHz²/K-µε.

Preferably, Pr(T) is less than 5 K/MHz, and more preferably less than 2.5 K/MHz, even more preferably less than 1.25 K/MHz.

Preferably, Pr(ε) is less than 100 µε/MHz, and more preferably less than 50 µε/MHz.

Table 4 which describes some mathematical relations between Brillouin shifts variations $\Delta v_1$ and $\Delta v_2$, temperature variation $\Delta T$, strain variation $\Delta \epsilon$, and coefficients $A_1$, $B_1$, $A_2$, $B_2$ representative of isothermal compressibility and adiabatic compressibility is shown below. Those mathematical relations give definitions of the criteria that are in Table 3c, and show where those criteria come from.

TABLE 4

$$\begin{pmatrix} \Delta v_1 \\ \Delta v_2 \end{pmatrix} = \begin{pmatrix} A_1 & B_1 \\ A_2 & B_2 \end{pmatrix} \begin{pmatrix} \Delta T \\ \Delta \varepsilon \end{pmatrix}$$

$$M = \begin{pmatrix} A_1 & B_1 \\ A_2 & B_2 \end{pmatrix}$$

$$\text{detM} = A_1 B_2 - A_2 B_1$$
$$\text{Pr}(T) = \sqrt{B_1^2 + B_2^2} / |\text{detM}|$$
$$\text{Pr}(\epsilon) = \sqrt{A_1^2 + A_2^2} / |\text{detM}|$$

FIG. 3 shows an example of two Brillouin shifts whose variations are used in a temperature and strain sensor according to embodiments of the invention. Two Stokes Brillouin shifts BS1 and BS2 at respectively two different frequencies $v_1$ and $v_2$ are separated by a gap d. FIG. 3 shows original gap d, with no strain and at usual outside temperature of for example 20° C. Maximal variation, due to temperature and strain constraints, of first Brillouin shift BS1 towards second Brillouin shift BS2 is d1. Maximal variation, due to temperature and strain constraints, of second Brillouin shift BS2 towards first Brillouin shift BS1 is d2. Preferably, those two Brillouin shifts BS1 and BS2 are designed not to mix with each other when they vary according to temperature and strain constraints.

Therefore, in dual sensing fiber, the two radial zones are sufficiently differently doped so that the gap between the two Brillouin shifts BS1 and BS2 exists for all variations of the two Brillouin shifts BS1 and BS caused by temperature and/or strain variations. That means that the sum of d1 and d2 maximal variations remain inferior to the original gap d so that both Brillouin shifts BS1 and BS2 remain distinct whatever temperature and strain variations in the environment of the dual sensor including a dual sensing fiber.

In an embodiment, the two radial zones are sufficiently differently doped so that respective variations of said two Brillouin shifts caused by a same temperature variation are different from each other of more than 20%, preferably of more than 50%. In an embodiment, the two radial zones are sufficiently differently doped so that respective variations of said two Brillouin shifts caused by a same strain variation are different from each other of more than 5%, preferably of more than 10%.

For temperature variations, variations of the two Brillouin shifts are preferably in the same direction, either increase of the two Brillouin shifts or decrease of the two Brillouin shifts, but of different magnitudes. For strain variations as well, variations of the two Brillouin shifts are preferably in the same direction, either increase of the two Brillouin shifts or decrease of the two Brillouin shifts, but of different magnitudes.

Figure 4:
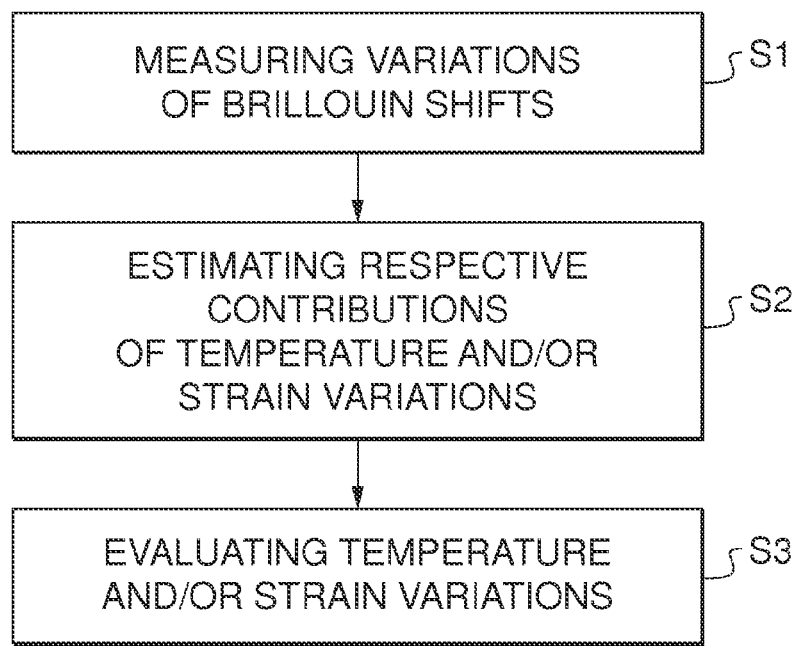
FIG. 4 shows an example of the steps that can be performed in a temperature and strain sensing method according to embodiments of the present invention.

FIG. 4 shows an example of the steps that can be performed in a temperature and strain sensing method according to embodiments of the invention. The temperature and strain sensing method comprises successively, a step S1 of measuring variations of Brillouin shifts, a step S2 of estimating respective contributions of temperature and/or strain variations, a step S3 of evaluating temperature and/or strain variations.

In step S1, the variations are measured of at least two distinct Brillouin shifts caused by variations of temperature and/or strain on a sensing optical fiber having at least two radial zones differently doped so as to present different isothermal and adiabatic compressibility coefficients. In step S2, the respective contributions are estimated of the temperature and/or strain variations to these measured variations of said two distinct Brillouin shifts. In step S3, the variations are evaluated of temperature and/or strain from these estimated contributions.

The invention has been described with reference to preferred embodiments. However, many variations are possible within the scope of the invention.

The invention claimed is:

1. A temperature and strain sensing optical fiber comprising at least two radial zones differently doped and having different isothermal and adiabatic compressibility coefficients between said two zones to differentiate the respective contributions, of temperature and strain variations, to the variations of at least two distinct Brillouin shifts of said sensing optical fiber being determined by Brillouin Optical Time Domain Reflectometry, wherein said two radial zones are differently doped in which
variations of said two Brillouin shifts, caused by a same temperature variation, differ from each other by more than 50%; and
variations of said two Brillouin shifts, caused by a same strain variation, differ from each other by more than 5%, wherein:
$\Delta v_1$ and $\Delta v_2$ being variations of said two Brillouin shifts, $\Delta \epsilon$ being a variation of strain constraint, $\Delta T$ being a variation of temperature constraint, $A_1$ and $A_2$ and $B_1$ and $B_2$ being Brillouin shift coefficients, in which A1 and A2 are given by dv1/dT and dv2/dT at constant strain, respectively; and B1 and B2 are given by dv1/de and dv2/de at constant temperature, respectively, wherein:

$$A_1 = \frac{dv_1}{dT} = C\alpha_1;$$

$$A_2 = \frac{dv_2}{dT} = C\alpha_2;$$

$$B_1 = \frac{dv_1}{d\varepsilon} = -C'\beta_{\tau 1};$$

$$B_2 = \frac{dv_2}{d\varepsilon} = -C'\beta_{\tau 2}$$

$a_1$ and $a_2$ being adiabatic compressibility coefficients and $b_{T1}$ and $b_{T2}$ being isothermal compressibility coefficients and C and C' are constants which do not depend on the material properties,
wherein $$\begin{pmatrix} \Delta v_1 \\ \Delta v_2 \end{pmatrix} = \begin{pmatrix} A_1 & B_1 \\ A_2 & B_2 \end{pmatrix} \begin{pmatrix} \Delta T \\ \Delta \varepsilon \end{pmatrix}$$

and $$M = \begin{pmatrix} A_1 & B_1 \\ A_2 & B_2 \end{pmatrix}$$

and det $M = A_1 B_2 - A_2 B_1$,
$|det M|$ is more than 0.02 MHz$^2$/K-µε.

2. The temperature and strain sensing optical fiber according to claim 1, wherein said two radial zones are differently doped and a gap exists between said two Brillouin shifts for all variations of said two Brillouin shifts caused by temperature and/or strain variations.

3. The temperature and strain sensing optical fiber according to claim 1, wherein said two radial zones are a core and a ring of said sensing optical fiber.

4. The temperature and strain sensing optical fiber according to claim 1, wherein said two radial zones comprise different doping combinations of the same doping materials, each said radial zone comprising at least two distinct doping materials.

5. The temperature and strain sensing optical fiber according to claim 1,
wherein at least a first doping material in a first of said two radial zones is at least five times more concentrated than said first doping material in a second of said two radial zones different from said first radial zone and/or
wherein at least a second doping material different from said first doping material, in said second radial zone is at least five times more concentrated than said second doping material in said first radial zone.

6. The temperature and strain sensing optical fiber according to claim 1,
wherein at least a first doping material is present in only a first of said two radial zones and/or
wherein at least a second doping material, different from said first doping material, is present in only a second of said two radial zones different from said first radial zone.

7. The temperature and strain sensing optical fiber according to claim 1, wherein said sensing optical fiber is a single mode optical fiber.

8. The temperature and strain sensing optical fiber according to claim 1, wherein:

$Pr(T) = \sqrt{B_1^2 + B_2^2}/|det\ M|$ and

Pr(T) is less than 5 K/MHz.

9. The temperature and strain sensing optical fiber according to claim 1, wherein:

$Pr(T) = \sqrt{B_1^2 + B_2^2}/|det\ M|$ and

Pr(r) is less than less than 100 µε/MHz.

10. A temperature and strain sensing method comprising:
a step of measuring by Brillouin Optical Time Domain Reflectometry, variations of at least two distinct Brillouin shifts caused by variations of temperature and/or strain on a sensing optical fiber having at least two radial zones differently doped to present different isothermal and adiabatic compressibility coefficients,
a step of estimating contributions of said temperature and/or strain variations to said measured variations of said two distinct Brillouin shifts, and
a step of evaluating said variations of temperature and/or strain, wherein:
$\Delta v_1$ and $\Delta v_2$ being variations of said two Brillouin shifts, $\Delta \varepsilon$ being a variation of strain constraint, $\Delta T$ being a variation of temperature constraint, $A_1$ and $A_2$ and $B_1$ and $B_2$ being Brillouin shift coefficients in which A1 and A2 are given by dv1/dT and dv2/dT at constant strain, respectively; and B1 and B2 are given by dv1/de and dv2/de at constant temperature, respectively, wherein:

$$A_1 = \frac{dv_1}{dT} = C\alpha_1;$$

$$A_2 = \frac{dv_2}{dT} = C\alpha_2;$$

$$B_1 = \frac{dv_1}{d\varepsilon} = -C'\beta_{\tau 1};$$

$$B_2 = \frac{dv_2}{d\varepsilon} = -C'\beta_{\tau 2}$$

$a_1$ and $a_7$ being adiabatic compressibility coefficients and $b_{T1}$ and $b_{T2}$ being isothermal compressibility coefficients and C and C' are constants which do not depend on the material properties,
wherein $$\begin{pmatrix} \Delta v_1 \\ \Delta v_2 \end{pmatrix} = \begin{pmatrix} A_1 & B_1 \\ A_2 & B_2 \end{pmatrix} \begin{pmatrix} \Delta T \\ \Delta \varepsilon \end{pmatrix}$$

and $$M = \begin{pmatrix} A_1 & B_1 \\ A_2 & B_2 \end{pmatrix}$$

and det $M = A_1 B_2 - A_2 B_1$,
$|det M|$ is more than 0.02 MHz$^2$/K-µε.

11. The temperature and strain sensing optical fiber according to claim 1, wherein variations of said two Brillouin shifts, caused by a same strain variation, differ from each other by more than 10%.

12. The temperature and strain sensing optical fiber according to claim 6, wherein the first doping material is germanium.

13. The temperature and strain sensing optical fiber according to claim 6, wherein the second doping material is aluminum, phosphorous, fluorine, or boron.

* * * * *